United States Patent [19]

Stuemky

[11] Patent Number: 5,483,852
[45] Date of Patent: Jan. 16, 1996

[54] TWIN SCREW EXTRUDER AND TORQUE SPLITTING TRANSMISSION

[75] Inventor: Robert M. Stuemky, Franktown, Colo.

[73] Assignee: The Gates Rubber Company, Denver, Colo.

[21] Appl. No.: 169,450

[22] Filed: Dec. 17, 1993

[51] Int. Cl.⁶ ................................. F16H 37/06
[52] U.S. Cl. .................. 74/665 GA; 74/665 F; 366/297; 425/204
[58] Field of Search ............. 74/665 GA, 665 GD, 74/665 F; 366/293, 296, 297, 298, 300, 301, 318; 264/176.1, 211.21; 425/204; 222/413, 333; 464/179

[56] References Cited

U.S. PATENT DOCUMENTS

| | | | |
|---|---|---|---|
| 3,824,875 | 7/1974 | Willert | 74/665 |
| 4,261,225 | 4/1981 | Zahradnik | 74/665 |
| 4,315,440 | 2/1982 | Chszaniecki | 74/665 G |
| 4,399,719 | 8/1983 | Chszaniecki | 74/410 |
| 4,796,487 | 1/1989 | De Bernardi | 74/665 GA |
| 5,158,725 | 10/1992 | Handa | 264/40.7 |
| 5,232,280 | 8/1993 | Moriyama | 366/83 |

FOREIGN PATENT DOCUMENTS

| | | |
|---|---|---|
| 2748918 | 5/1979 | Germany . |
| 3420918 | 12/1985 | Germany . |
| 2051885 | 7/1992 | Germany . |
| 4129913 | 3/1993 | Germany . |

OTHER PUBLICATIONS

Patent Abstracts of Japan, vol. 3, No. 152 (C–67) 14 Dec. 1979, (JP–A–54 130 666) Hitachi Zosen K.K.
S.A.E. Paper No. S–263.

*Primary Examiner*—Rodney H. Bonck
*Assistant Examiner*—Chong H. Kim
*Attorney, Agent, or Firm*—H. W. Oberg; C. H. Castleman; S. G. Austin

[57] ABSTRACT

A twin screw extruder and torque splitting transmission has two output shaft portions that are axially spaced apart a distance and are connected to elongate shafts where at least one is bent along its length and powered by a driven pinion gear that has a diameter that is greater than the distance between the axes of the twin screws.

16 Claims, 3 Drawing Sheets

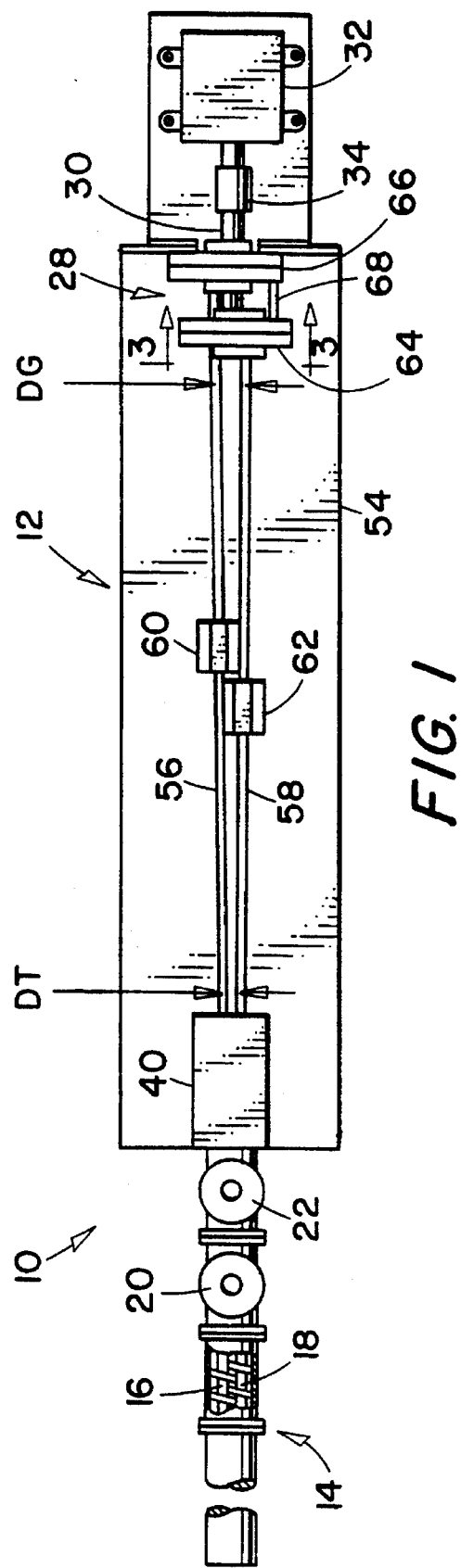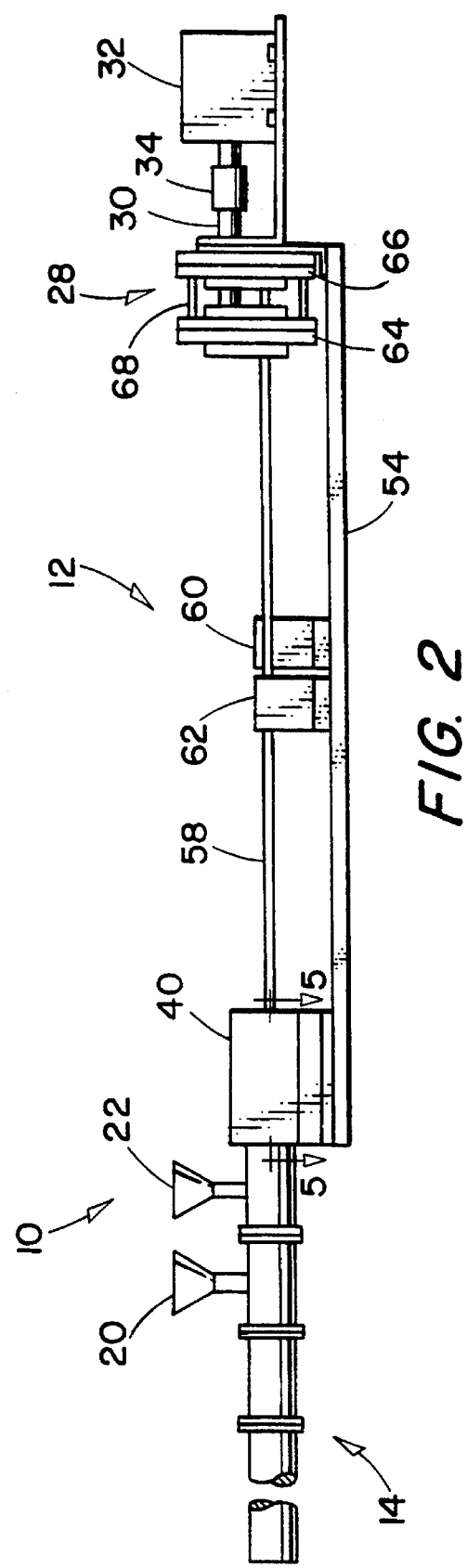

TWIN SCREW EXTRUDER AND TORQUE SPLITTING TRANSMISSION

BACKGROUND OF THE INVENTION

One aspect of the invention relates to twin screw mixer/extruders, but more particularly, another aspect of the invention relates to a torque splitting transmission.

The relatively small distance required between the axes of the screw shafts of a twin screw extruder has historically limited the diameters of final drive pinion gears of a torque splitting transmission for driving the closely spaced twin screws. The pinion gear size is limited as a function of the center distance between the shafts. In one extreme, the diameter of the driven pinion gears cannot be greater than the distance between two co-rotating shafts. In another extreme where the drive gear pinions are axially offset from the other, one of the pinion gears cannot have a radius that is greater than the difference between the distance between the shafts and the radius of one shaft.

Unfortunately, the torque capacity of a gear varies with the cube of its diameter and the small diameter of the pinion gear(s) is a limiting factor of the torque that can be delivered to the twin screws whose torque capacity is typically greater than the torque capacity of the pinion gear(s). In operation, twin screws generate an axial force that is carried as a thrust load into the torque splitting transmission. There are several prior art solutions to enhance the torque limitations associated with a small diameter pinion gear and bearing loads induced by the pinion gear and twin screws.

The techniques for enhancing the torque capacity of torque splitting transmissions with closely spaced output shafts involve avoiding overloading relatively small teeth of the pinion gear. For example, the output torque capability of a transmission may be enhanced by using helical gears instead of spur gears for the pinion gear to increase the number of teeth in contact with each other such as disclosed in U.S. Pat. No. 4,261,225. Another way of avoiding overloading the pinion gear teeth and enhancing torque output capability using spur gears, is to use planetary gearing to engage two teeth of spur type pinion gears as is disclosed in U.S. Pat. No. 3,824,875. Another gear arrangement involving spur teeth pinion gears is shown in U.S. Pat. No. 4,315,440 where two teeth of the pinion gear are in contact with other spur gears for the purpose of halving the tooth loading to the small diameter pinion gear. A way of insuring that the tooth loading is proportionately shared between two teeth of a pinion gear is shown in the elaborate arrangement of gearing disclosed in U.S. Pat. No. 4,399,719 where a radially movable drive pinion gear is used to split torque into two components.

The prior art solutions show that the output torque of a transmission may be at best doubled by engaging two teeth of a small diameter pinion gear whose diameter is limited by the distance between the axes of the twin screw extruders. The torque output capability of such gearing is less than the torque handling capability of the twin screws and thus, is a limiting factor in the output capacity of the twin screw extruder.

Another problem associated with a pinion gear is that it generates radial forces which must be carried by bearings which are limited in size because of the small distance between the axes of the twin screws.

In other words, the small diameter of the pinion gear limits the amount of power that can be transmitted to this gear and the power delivered by the gear is below that capable of being received by the screws.

SUMMARY OF THE INVENTION

In accordance with the invention, a twin screw extruder and a torque splitting transmission are provided wherein the torque splitting transmission has two output shaft portions that are axially spaced apart a distance substantially equal to the distance between the axes of twin screws. At least one of the output shafts is bent along its length and powered by a driven pinion gear having a diameter that is greater than the distance between the axes of the twin screws. The larger size pinion gear substantially enhances the output torque capability of the transmission and consequently, the torque capacity of the transmission approaches or equals the torque carrying capacity of the twin screws. Improved output torque capacity results in an extruder with substantially improved throughput capability.

An object of the invention is to provide a torque splitting transmission with two output shafts spaced apart a distance and wherein the smallest diameter pinion driving at least one of the shafts has a diameter that is greater than the spacing between the shafts.

Another object of the invention is to provide a twin screw extruder with improved throughput derived from a transmission whose torque carrying capacity is enhanced by a small drive pinion having a diameter that is greater than distance between the axes of the twin screws of the extruder.

An advantage of the invention is that the extruder is capable of operating at lower shaft speeds which results in enhanced throughput as a result of greater torque capacity of the transmission. These and other objects or advantages of the invention will be apparent after reviewing the figures and description thereof wherein:

FIG. 1 is a top view of an extruder and transmission of the invention showing a foreshortened twin screw portion of the extruder;

FIG. 2 is a front view of the extruder and transmission as shown in FIG. 1;

DESCRIPTION OF A PREFERRED EMBODIMENT

Figure 3:
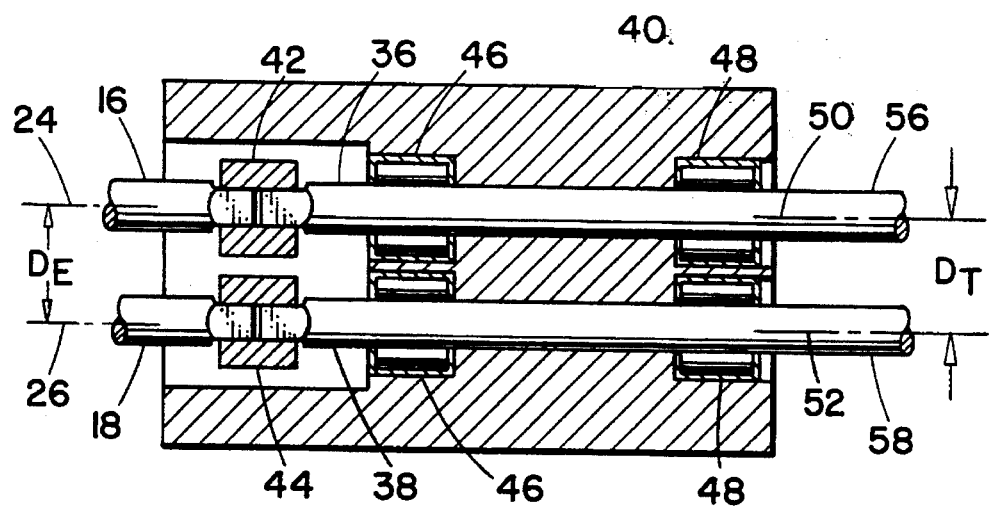
FIG. 3 is a partial cross-sectional view taken along the line 5—5 of FIG. 2 and showing an interconnection between output shaft portions of the transmission and twin screws of the extruder.

Referring to FIGS. 1, 2 and 3, a mixer 1 extruder 10 and transmission 12 of the invention has a barrel 14 housing twin screws 16, 18 and one or more feed input ports 20, 22. The barrel operates in known fashion for mixing materials and forming an extrudate, not shown. The twin screws 16, 18, have axes 24, 26 that are spaced a distance DE apart and are driven by torque splitting gearing 28 of the transmission 12 that includes an input shaft 30 coupled to a motor 32 by means of a coupling 34.

The torque splitting gearing is interconnected to output shaft portions 36, 38 at a bearing block assembly 40. The output shaft portions 36, 38 are coupled to the screws 16, 18 such as by means of splined or square sleeves 42, 44. Axially spaced apart bearings 46, 48, such as needle bearings, support the output shaft portions in substantially parallel alignment. The shaft end portions have axes 50, 52 that are spaced a distance DT apart and which distance is equal to the distance DE between the screw axes. The bearing block, torque splitting gearing, and motor are held in a spatial relationship to each other by means of a frame member or a base member 54.

Two flexible elongate shafts 56, 58 are intermediate and interconnect the shaft end portions with the gearing. In a preferred embodiment as shown, the shaft end portions 36, 38, are an integral part and extension of the elongate shafts 56, 58. Each shaft is bent along its length and, in the embodiment shown, in "S" fashion such that the ends of the shaft are parallel. The shafts are sufficiently bent whereby their axes juxtaposed the gearing are spaced a distance DG apart and which distance is greater than the distance DT such as to provide space for a final drive pinion gear of the gearing 28 which pinion gear has a diameter that is greater than the distance DT, DE, between the output shaft portions as hereinafter further explained. Optionally, a second bearing block 60, 62, may be used as a means for supporting a midportion of each elongate shaft to enhance its resistance to buckling when the transmission is in use.

The gearing may be very simple and may be in the form of two interconnected spur gear boxes 64, 66, held in an axially spaced relationship by rods 68. Of course, a single gear box with a single housing may be used.

Figure 4:
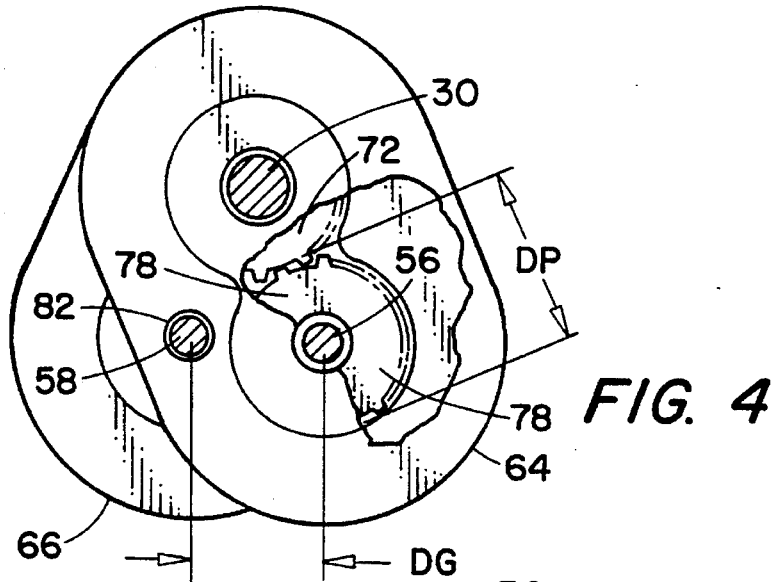
FIG. 4 is an enlarged and partially broken away view taken along the line 3—3 of FIG. 1 showing an arrangement of gear boxes as one embodiment of the invention.
Figure 5:
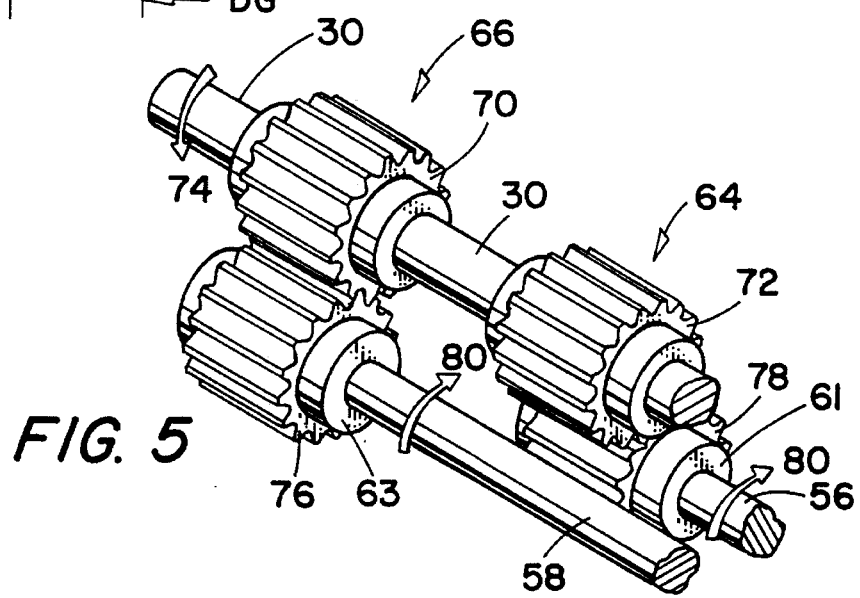
FIG. 5 is an enlarged schematical isometric view of the gearing of FIG. 4 without gearbox housings to show torque-splitting power flow of the transmission.

Referring to FIGS. 4 and 5, the spur gear boxes 64, 66, are positioned in series with input drive pinions 70, 72 in axial alignment with each other and connected to the input shaft 30 whereby the drive pinions rotate in the same direction such as a counter clockwise direction 74 when driven by the motor 32. The input drive pinion 70, 72, of each spur gear box is in constant mesh with a final drive output pinion gear 76, 78 which each have a diameter DP. The drive pinion gears rotate in the same clockwise direction 80. An opening 82 is provided in the forwardly positioned spur gear box 64 to provide axial access for elongate shaft 58 to be interconnected to the final drive pinion gear 76 of the rearwardly positioned spur gear box 66. Each flexible elongate shaft 56, 58 is connected to the final drive pinion gear 76, 78 of each spur gear box 64, 66 and rotates with the pinion gears in the same clockwise direction 80. The diameter DP of the drive pinion gears 76, 78 is greater than the distance DE between the axes of the screws or distance DT between the output shaft portions of the transmission. Optionally, the diameter DP of the drive pinion gears may also be greater than the distance DT between the output shaft portions of the transmission by axially offsetting the drive pinions as illustrated. The large diameter final drive output pinion gears and their supporting bearings provide the transmission with enhanced torque carrying capability over that experienced with the prior art transmissions having smaller drive pinion gears. The spur gear boxes are pivoted relative to each other about the input shaft 30 so that the axes of the final drive pinions are parallel and spaced a distance DG apart.

Figure 6:
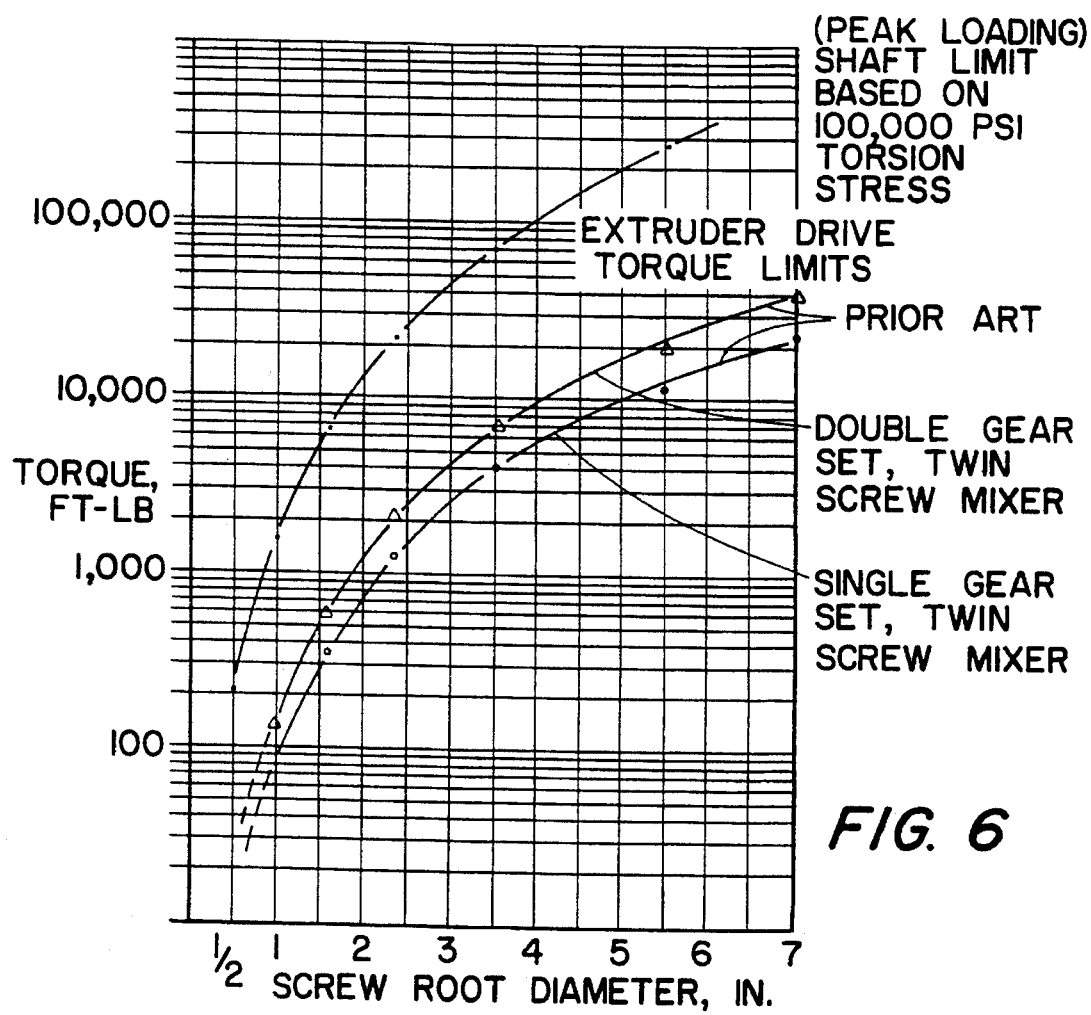
FIG. 6 is a chart showing torque limitations as a function of twin screw root diameters for prior art mixer 1 extruders and transmissions of the invention.

Enhanced torque carrying capability resulting from the application of gears having a diameter that is greater than the distance between the axes of the screws of an interconnected extruder is characterized by the logarithmic chart of FIG. 6. Torque output capacity of prior art transmissions and the torque availability of a transmission of this invention is shown as a function of the root diameter for twin screw mixer/extruders. The lower curve shows the output torque availability of a single gear set transmission for a twin screw mixer/extruder where the final drive pinion has a diameter that is restricted to being less than the distance between the axes of the screws of the mixer/extruder.

The middle curve shows the output torque capacity of a transmission as being doubled over that of the lower curve when two gear teeth of a final drive pinion gear are used in driving the transmission such as for example, the transmission disclosed in U.S. Pat. No. 4,399,719. The upper curve represents a torque capacity limit for a transmission of the invention where the elongate shafts have diameters that are substantially equal to the root diameter of the screws as based on a 100,000 psi torsional stress. This represents a substantial improvement over transmissions and extruders of the prior art.

To better illustrate the enhanced torque capabilities of the transmission of the invention, a transmission was built in the configuration as illustrated by FIGS. 1–5 and with the following specifications:

| | |
|---|---|
| Root Shaft Diameter, Screws | 0.708 in. |
| Space Apart Distance, DE, DT | 0.850 in. |
| Space Apart Distance, DG | 2.000 in. |
| Length, Elongate Shaft, 56 | 50.0 in. |
| Length, Elongate Shaft, 58 | 45.5 in. |
| Diameter, Elongate Shafts | 0.625 in. |
| Spur Gear Box Type | Hub City Model 22, Modified |
| Pitch Diameter, Drive Pinion Gear, DP | 3.000 in. |
| Torque Output Capacity, transmission | 150, ft-lbs at 50 rpm |

The diameter of the pinion gears may be up to ten times or more greater than the distance between the axes of the screws and depending on the lengths of the elongate shafts. The elongate shafts may have a length from about 25 to about 100 times the distance between the screws to facilitate bending along their length to provide space for the drive pinion gear. The diameter of the elongate shaft may vary as for example from about 0.5 to about 2 times the root diameter of the screw and depending on the lengths chosen for the elongate shafts. In operation, axial thrust loads generated by the screws 16, 18 are transmitted to the respective interconnected shafts 56, 58 and carried by bearings 61, mounting the drive pinions.

The above illustrated extruder and transmission exhibited a 30 percent improvement over extruder and transmission combinations of the prior art.

ADDITIONAL EMBODIMENTS OF THE INVENTION

Figure 7:
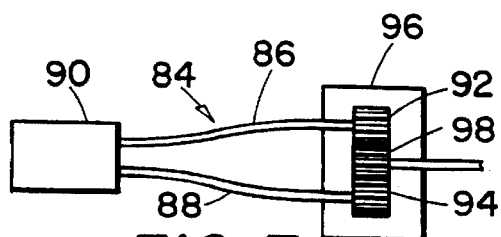
FIGS. 7–9 are schematical top views of shaft and gearing arrangements for additional embodiments of the transmission of the invention.
Figure 9:
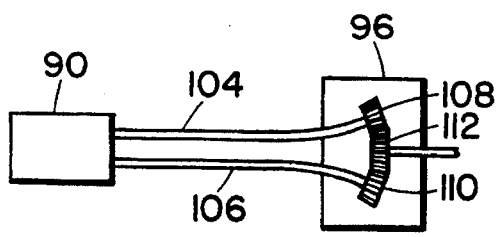
Figure 8:
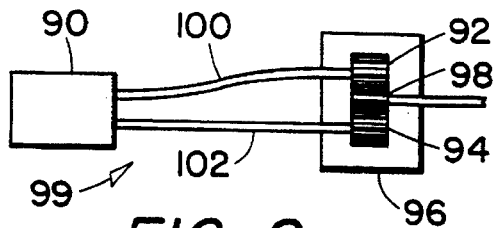

Referring to FIGS. 7, 8, and 9, additional embodiments of the invention are schematically represented to show how the elongate shafts can be bent along these lengths in various configurations so that the diameter of a final pinion gear is greater than the distance between the axes of screws and output shafts of a transmission. In FIG. 7, a transmission 84 has elongate shafts 86, 88 intermediate shaft output portions at a bearing block 90 and final drive pinion gears 92, 94 of a gear box 96. The pinion gears 92, 94 mesh with a common drive pinion 98 whereby the shafts 86, 88, counter-rotate in relation to each other.

FIG. 8 shows a transmission 99 that is similar to that of FIG. 7 except for the arrangement of elongate shafts 100, 102. Elongate shaft 100 is bent into an "S" shape such that its ends are parallel and elongate shaft 102 is substantially straight.

The transmission of FIG. 9 is similar to that of FIG. 7 and 8 except for the arrangement of the elongate shafts 104, 106 which are bent along their lengths so the ends thereof are in angular misalignment relative to each other. The shafts are interconnected to final drive pinion gears 108, 110 which are of the bevel type and driven by another bevel gear input drive pinion 112.

The foregoing detailed description is made for purpose of illustration only and is not intended to limit the scope of the claims.

What is claimed is:

1. An extruder with twin screws having axes spaced a distance apart and driven by torque splitting gearing that includes at least one final drive pinion driving at least one of the screws and wherein the improvement comprises:

at least one flexible elongate shaft intermediate between and interconnecting the drive pinion and screw, the shaft sufficiently bent along its length to provide space for the drive pinion gear which has a diameter that is greater than the distance between the axes of the screws.

2. The extruder as claimed in claim 1 wherein the diameter of the drive pinion is up to ten times the distance between the axes of the screws.

3. The extruder as claimed in claim 1 including a final drive pinion driving each of the screws and a flexible elongate shaft intermediately interconnecting each drive pinion and screw, and wherein each shaft is bent along its axis sufficiently and such that the diameter of each drive pinion is greater than the distance between the axes of the screws.

4. The extruder as claimed in claim 3 wherein ends of each elongate shaft are offset and substantially parallel.

5. The extruder as claimed in claim 4 wherein axial thrust loads generated by the screws are transmitted to respective interconnected shafts and carried by bearings mounting the drive pinions.

6. The extruder as claimed in claim 4 and further including a bearing as a means for supporting a mid-portion of each shaft.

7. The extruder as claimed in claim 1 wherein the elongate shaft has a length that is from about 25 to about 100 times the distance between the screws.

8. The extruder as claimed in claim 1 wherein each screw has a root diameter and each elongate shaft has an outside diameter where the outside diameter of the elongate shaft is from about 0.5 to about 2 times the root diameter of the screw.

9. In a transmission of the torque splitting type with two output shaft portions having axes spaced a distance apart and driven by torque splitting gearing that includes at least one final drive pinion gear driving at least one of the shaft portions, wherein the improvement comprises:

at least one flexible elongate shaft intermediate between and interconnecting the drive pinion gear and one of the output shaft portions, the elongate shaft sufficiently bent along its length such as to provide space for the drive pinion gear which has a diameter that is greater than the distance between the output shaft portions.

10. The transmission as claimed in claim 9 wherein the elongate shaft has an end portion that forms the output shaft portion.

11. The transmission as claimed in claim 9 wherein the diameter of the drive pinion gear is up to ten times the distance between the axes of the output shaft portions.

12. The transmission as claimed in claim 9 wherein there is a final drive pinion for each output shaft portion and a flexible elongate shaft intermediately interconnects each drive pinion gear and output shaft portion, each shaft bent along its length sufficiently such to provide space for each drive pinion gear which has a diameter that is greater than the distance between the output shaft portions.

13. The transmission as claimed in claim 12 and further including a bearing intermediate each output shaft portion and drive pinion as a means for supporting a mid-portion of each shaft.

14. The transmission as claimed in claim 12 wherein axial thrust loads received at the output shaft portions transmitted to respective interconnected elongate shafts and carried by bearings mounting the drive pinion gears.

15. The transmission as claimed in claim 9 wherein ends of each elongate shaft are offset and substantially parallel.

16. The transmission as claimed in claim 9 wherein the elongate shaft has a length that is from about 25 to about 100 times the distance between the output shaft portions.

* * * * *